J. H. MUMMA.
Broom Head.
No. 53,654.
Patented April 3, 1866.
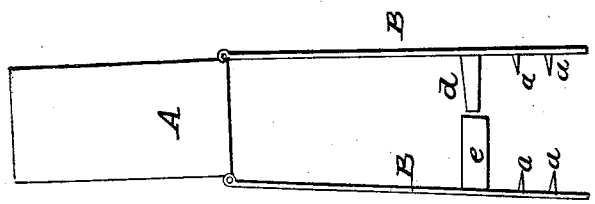
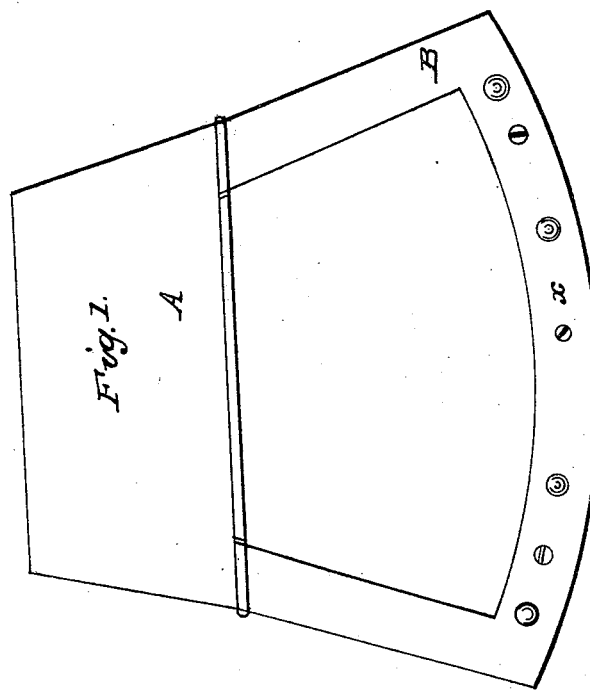
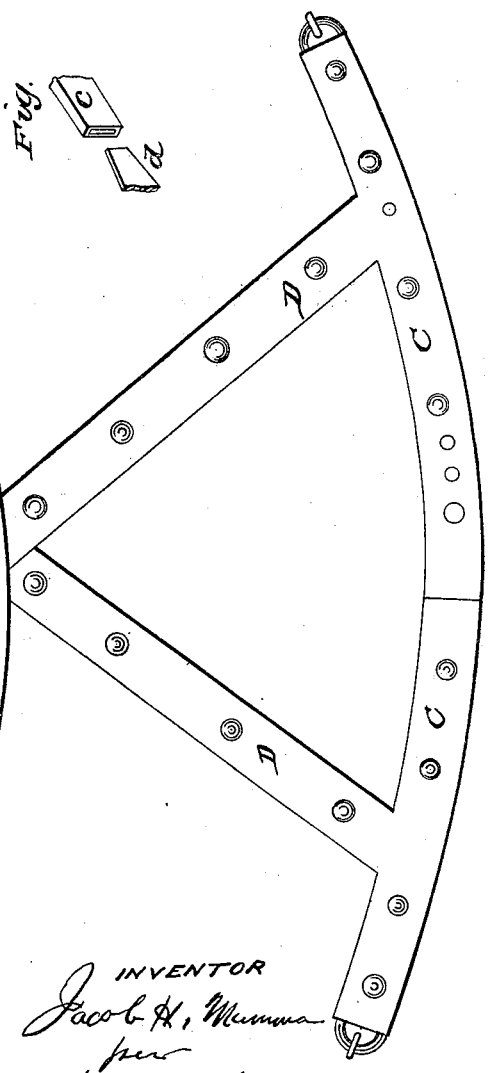
WITNESSES
INVENTOR

UNITED STATES PATENT OFFICE.

JACOB H. MUMMA, OF HARRISBURG, PENNSYLVANIA.

IMPROVED BROOM-HEAD.

Specification forming part of Letters Patent No. 53,654, dated April 3, 1866.

*To all whom it may concern:*

Be it known that I, JACOB H. MUMMA, of Harrisburg, in the State of Pennsylvania, have invented certain new and useful Improvements in Broom-Heads; and I do hereby declare that the following is a full, clear, and exact description of the same, reference being had to the accompanying drawing, and to the letters of reference marked thereon.

In the annexed drawing, making part of this specification, A represents a metallic case or cup which is provided with a hole to receive the broom-handle, and which receives in it and confines the butts or heads of the straws of which the broom is made. This cup is about two and a half or three inches deep.

B B represent two jaws made in the form shown, one of said jaws being permanently secured to the cup A on one side, while the other jaw is hinged to the opposite side of the cup. Upon one of the jaws is a sleeve, c, into which passes an arm, d, which is secured to the other jaw. In placing straws in this head the hinged jaw is first turned up. When the head is full the jaw is turned down again, the arm d passing into sleeve c. Each jaw is provided with pins which pass into the straws for holding them in position. Several screws pass through the jaws and through the straws, which serve to draw the jaws tightly against the straws, clamping them firmly.

D D represent metallic bars, which are made straight, and which have secured to their outer ends the curved bars C C. The bars C C are provided on their inner ends with openings to receive screws for the purpose of jointing them. The bars D D meet between the jaws B B, and are confined to them by means of a screw which passes through the jaws and bars. The object of the bars D and C is to confine the broom-straws about or below their center, so as to keep them in proper position. The object of jointing the bars C C is that this portion of the broom-head may be enlarged or contracted to suit different-sized brooms.

The bars C C and D are provided with teeth, which pass into the broom-straws, and the bars C C are provided on their outer ends with hooks, which are intended for confining the ends of said bars around the edges of the broom to each other.

Having thus fully described my invention, what I claim as new, and desire to secure by Letters Patent, is—

1. The combination of the jaws B B with the case A, one of the said jaws being hinged to the case, as represented, and one provided with an arm and the other with a sleeve, substantially as and for the purpose herein specified.

2. The bars C C and D D, constructed so as to form a joint for expanding to suit the broom.

3. The combination of the jaws B B with the bars D D and C C, when constructed and used as and for the purpose herein specified.

In witness that I claim the foregoing I have hereunto set my name in the presence of two witnesses.

J. H. MUMMA.

Witnesses:
J. M. MASON,
C. M. ALEXANDER.